Sept. 30, 1941 — A. W. SEYFRIED — 2,257,705
SUCTION CLEANER HOSE AND COUPLING
Filed May 27, 1940
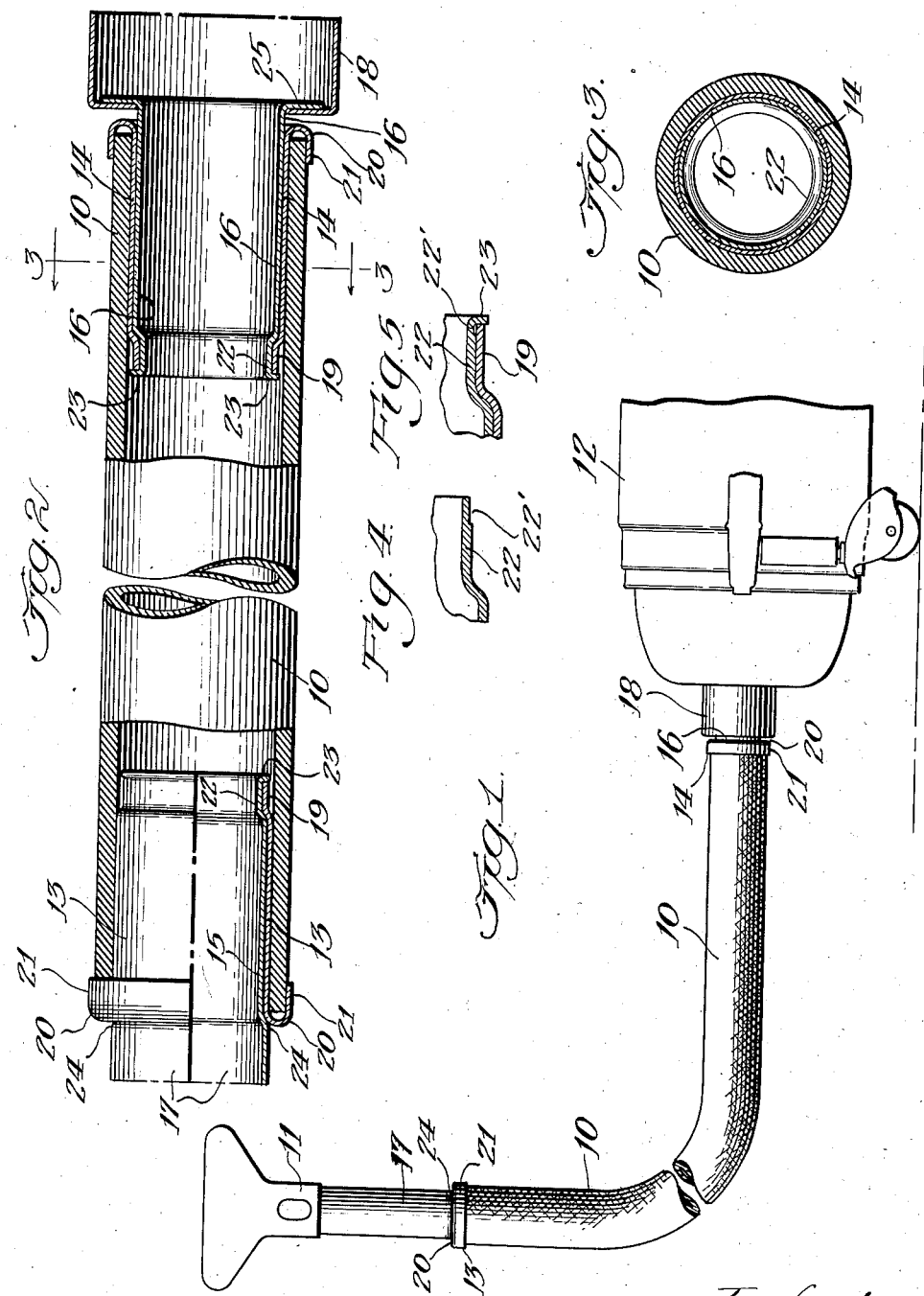
Inventor:
Arthur W. Seyfried,
By Bertha L. McGregor
Atty.

Patented Sept. 30, 1941

2,257,705

UNITED STATES PATENT OFFICE 2,257,705

SUCTION CLEANER HOSE AND COUPLING

Arthur W. Seyfried, Racine, Wis., assignor to Scovill Manufacturing Company, Waterbury, Conn., a corporation of Connecticut Application May 27, 1940, Serial No. 337,350

4 Claims. (Cl. 285—97.7)

This invention relates to suction cleaner hose and couplings for conducting air from the cleaner tool or nozzle to the cleaner mechanism. The main object of the invention is to provide a hose having an attaching coupling at one end for removably attaching the hose to a cleaner housing and having an applicator or tool coupling at the other end for removably attaching a cleaning tool to the said end, said hose and couplings being rotatable relatively to each other.

Another object is to produce a hose having coupling means of the character described, each coupling consisting of only two parts rotatable relatively to each other, free from packing, but substantially air-tight.

In the drawing:

Fig. 1 is an elevational view of a suction cleaner hose and couplings embodying my invention, showing a tool coupled to one end and part of the suction cleaner coupled to the other end of the hose.

Fig. 2 is a longitudinal sectional view of the hose and couplings, on an enlarged scale, partly in section, part of the hose and the outer ends of the coupling members being broken away.

Fig. 3 is a transverse sectional view taken in the plane of the line 3—3 of Fig. 2.

Fig. 4 is a sectional view, enlarged, of a detail of the construction in the process of manufacture, and Fig. 5 is a similar view showing the part illustrated in Fig. 4 completed and assembled with the cooperating coupling member.

In that embodiment of the invention shown in the drawing, the suction cleaner hose, indicated as a whole by the numeral 10, connects the applicator or tool 11 to the suction cleaner 12. The hose 10 has a coupling at each end, each consisting essentially of two members. The coupling members 13 and 14, respectively, which fit closely against the inner surfaces of the hose 10 at each end, are identical, whereas the cooperating coupling members 15 and 16 are identical in that portion which fits within the members 13 and 14, respectively, but may differ in form at the free ends 17 and 18, respectively, to conform to the requirements of the tool 11 and cleaner housing 12 in which they fit.

The coupling members 13 and 14 are cylindrical in form, the major portion thereof being of such diameter as to fit snugly within the hose 10, each having an offset portion 19 at the inner end and a reversely curved portion 20 at the opposite end terminating in an external hose engaging end 21.

The coupling members 15 and 16 are also cylindrical in form, the major portion thereof being of such diameter as to fit snugly within the coupling members 13 and 14, respectively, each having an offset portion 22 complemental to the offset portions 19, said offset portion 22 terminating in a right angle flange 23 extending outwardly across the edge of the offset part 19 of the other coupling members 13 or 14. Preferably, the outer surface of the offset end of each member 15 and 16 is cut away as indicated at 22' in Fig. 4 so that the flange 23 may be formed on the offset portion 22 without forming a radius which would interfere with the proper fit and rotation of the part 19 relatively to the flange 23. Cutting the coupling members 15 and 16 as indicated at 22' prevents binding of the cooperating coupling members at the flanged end 23. By making the flange surface flat, the end of the offset potrion 19 can abut it and form an air lock and yet relative rotation may be had without undue friction.

The coupling member 15, in the present embodiment, has a rib or shoulder 24 located on the part 17 so as to abut the curved portion 20 of the coupling member 13 when assembled as shown. The shoulder 24 aids in retaining the parts in rotatable assembled relation. The end portion 17 is adapted for insertion in the tool 11.

The coupling member 16 may have an integrally formed portion 18 for insertion in the cleaner housing, or it may be flanged as shown at 25, to engage and be connected to the member 18.

The coupling members 13 and 14 are inserted in and cemented or otherwise fixedly secured to the hose 10, and the members 15 and 16, respectively, are rotatably mounted therein. The form of the cooperating members is such that they provide a rotatable air-tight joint without the aid of packing.

Changes may be made in details of construction without departing from the scope of my invention.

I claim:

1. A suction cleaner hose having a coupling on at least one end thereof, said coupling comprising a pair of nested tubular members, the major portion of the outer tubular member having a diameter for snugly engaging the inner wall of the hose and being secured thereto, the major portion of the inner tubular member having a diameter for rotatable engagement with said first major portion, said tubular members being inwardly offset at corresponding ends inwardly of the end of the hose and providing relatively short rotatably engaged cylindrical extensions of the respective major portions and of less diameter than said respective major portions, and a flange on one of said extensions in rotatable contact with the end of the other extension.

2. The structure according to claim 1 wherein the outer tubular member at its end opposite said offset is reversely curved providing a pocket receiving the end of the hose.

3. A suction cleaner hose having a coupling on at least one end thereof, said coupling comprising a tubular member secured to the inner wall of the hose throughout the major portion of the length of said tubular member, said tubular member having a reversely curved end portion extending over the free end of the hose and engaging the outer wall thereof adjacent said free end, and a second tubular member within and rotatably engaged with said first tubular member, each of said tubular members at corresponding ends opposite said reversely curved end portion being offset to maintain said tubular members against relative axial movement.

4. A suction cleaner hose having a coupling on at least one end thereof, said coupling consisting essentially of a tubular member inserted in and fixedly secured to the hose throughout the major portion of the length of said tubular member, and a second tubular member within and in rotatable engagement with said first tubular member, each of said tubular members having an offset portion adjacent one end, said offset portions engaging each other, and the second tubular member having a flange on said offset end, said flange extending radially toward the hose adjacent the inner edge of the offset portion of said first tubular member and preventing longitudinal movement of said second tubular member in one direction relatively to said first tubular member, and the junction between the flange and offset portion of said second tubular member forming a right angle for receiving the end of the other offset portion in a relatively air tight fit.

ARTHUR W. SEYFRIED.